May 8, 1962        O. K. KELLEY        3,033,053

TRANSMISSION BRAKE

Filed July 7, 1953                         2 Sheets—Sheet 2

MANUAL VALVE - DRIVE,
COAST BRAKING PREVENTED

MANUAL VALVE - DRIVE,
COAST BRAKING PERMITTED

INVENTOR
Oliver K. Kelley
BY J. L. Chisholm
ATTORNEY

United States Patent Office 3,033,053
Patented May 8, 1962

3,033,053
TRANSMISSION BRAKE
Oliver K. Kelley, Birmingham, Mich., assignor to General Motors Corporation, Detroit, Mich., a corporation of Delaware
Filed July 7, 1953, Ser. No. 366,497
48 Claims. (Cl. 74—472)

This invention relates to braking systems for motor vehicles.

One of its principal objects is to provide an improved automatic coast or downhill braking system which will prevent the vehicle from coasting faster than a chosen speed, which speed may be set or changed very simply by the driver, at will.

More specifically I want to apply the brakees automatically whenever the coasting car goes faster than the chosen speed and to adjust the braking force constantly and automatically according to the amount of the excess speed.

The invention is particularly adapted to be used on cars equipped with hydraulically operated transmissions and it is here shown by way of example only as so applied, although its use is not restricted to such cars.

Other objects and advantages of the invention will be apparent from the following description and accompanying drawings in which.

Figure 1:
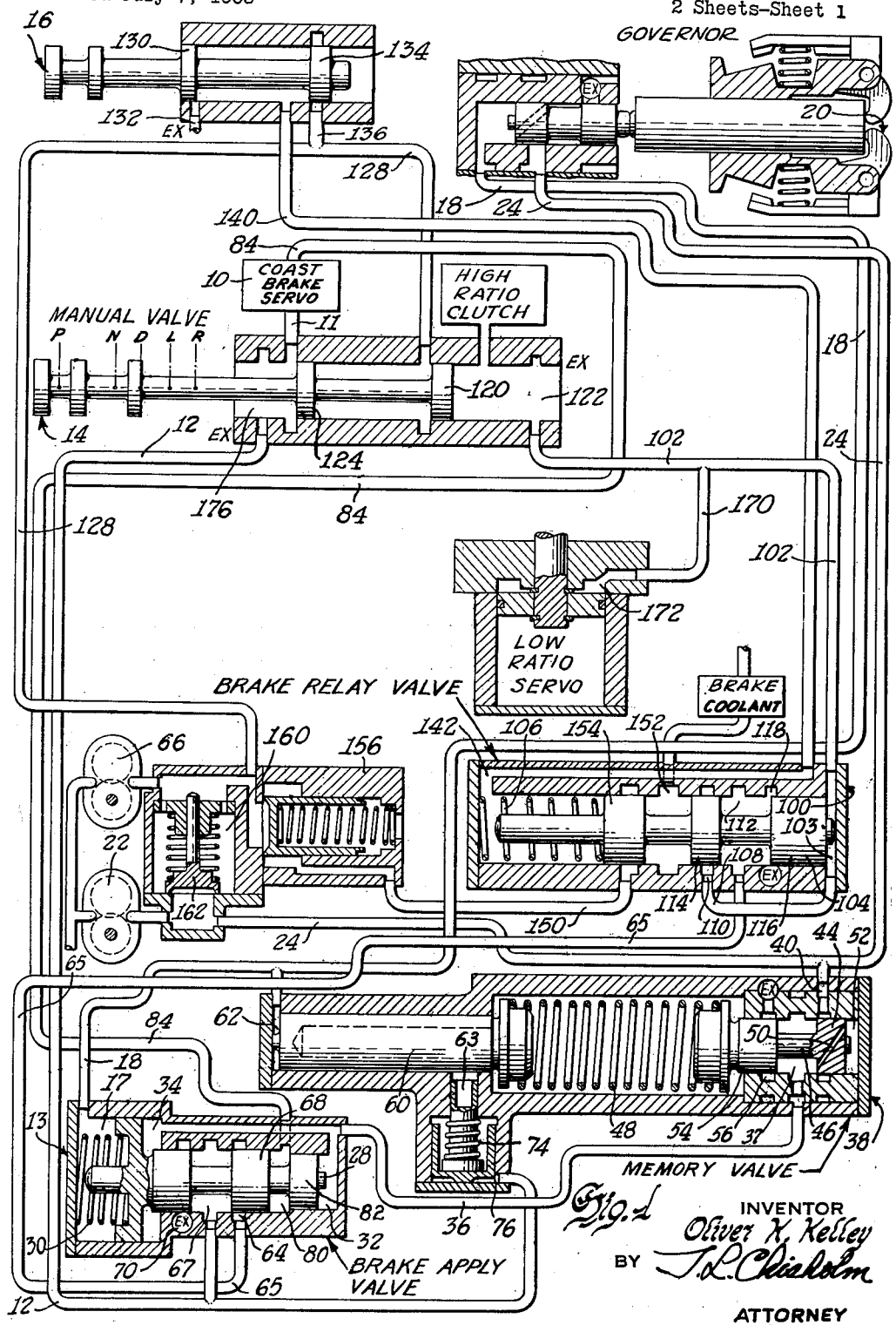
FIG. 1 is a schematic drawing of one form of my improved braking system, combined by way of example with certain features of a hydraulically controlled transmission.

The vehicle has any suitable brake which can be applied with varying force by variable pressure in a hydraulic cylinder or servo. In the upper part of FIG. 1, 10 represents schematically the brake and its apply servo which can conveniently be a reverse reaction brake of an automatic transmission, as will be explained. The servo can be supplied with oil under varying pressure from a conduit 11 which can be connected with a brake apply conduit 12 leading from a pressure regulator valve 13 shown in the lower left corner of FIG. 1. Supply of oil to the brake servo is permitted or prevented under appropriate conditions by a manual selector valve 14 which can interrupt the connection between conduit 11 and brake apply conduit 12, or by a throttle relay valve 16 which interrupts the supply of oil to the brake apply conduit whenever the engine throttle is open, as hereafter described. The brake pressure regulator valve 13 is the principal device which applies and releases the brake and controls its application pressure. This valve, in turn, is controlled jointly in accordance with the actual speed of the vehicle and with a chosen coasting speed so as to maintain a brake apply pressure which is a measure of the excess of actual speed over the desired maximum coasting speed.

The actual speed control includes a pressure chamber or governor chamber 17, in the left end of valve 13, supplied with oil by a governor delivery conduit 18 connected to a vehicle-driven governor 20 in the upper right corner of FIG. 1 which receives soil at constant pressure from any suitable supply, for example a conduit 24 connected to a constant pressure pump 22 (called a rear pump) driven by the propeller shaft of the car. Any suitable form of governor may be used which takes oil from the constant pressure line 24 and delivers it to the governor delivery line 18 at a pressure which is a measure of car speed.

For example, the governor may be that shown in U.S. Patent 2,865,227 issued jointly to me and Robert S. Plexico, the disclosure of which is included by reference. The car speed signal pressure delivered by the governor acts in chamber 17 in the brake pressure regulator valve to urge valve stem 28 to the right with a force measured by car speed. The valve stem is also urged constantly to the right by a biasing spring 30.

The control based on chosen maximum coasting speed includes pressure chambers 32 and 34 in valve 13, which together urge the valve stem 28 to the left against governor pressure and against spring 30 by a hydraulic pressure which is a measure of chosen maximum coasting speed. This coasting speed pressure signal is maintained in chambers 32 and 34 by a conduit 36 leading from a regulated pressure chamber 37 in a memory valve or brake dispatch valve, generally denoted by 38, which receives oil at a constant pressure at inlet port 40 from rear pump delivery line 24. Port 40 can communicate with the chamber 37 when permitted by an inlet land 44 on a valve stem 46 which is constantly urged to the right by a spring 48. In the extreme right-hand position the land 44 admits oil to chamber 37 where it communicates through bore 50 in land 44 with a pressure control chamber 52, in which the pressure of the oil urges the valve stem to the left against spring 48 tending to close inlet port 40. When the valve stem 46 has moved far enough to the left, land 44 closes port 40 and upon further slight movement to the left an exhaust land 54 opens slightly an exhaust port 56 which reduces the pressure in chambers 37 and 52. Reduction of pressure tends to let the spring 48 return the valve stem toward the right again closing the exhaust port 56 and, if moved sufficiently, again opening the inlet port 40. This constitutes a regulator which, as is well-known, maintains in chamber 37 of the memory valve and hence in chambers 32 and 34 of the pressure regulating valve 13 a constant pressure proportional to the force exerted by the spring 48.

I use this pressure in chamber 37 as a varying instantaneous index of car speed which can be set at any instant into a memory device in the memory valve and thus become a constant index of desired maximum coasting speed. To this end, when the car is being driven by the engine, I maintain the force of the spring 48 as an instantaneous index of car speed by an adjusting abutment or governor plug 60 on which one end of spring 48 bears. The position of the abutment determines the force of the spring on valve stem 46 and this position is in turn determined by the pressure in a memory valve governor chamber 62 in which the governor plug 60 may slide and in which pressure is maintained which is a measure of instantaneous car speed, by the governor delivery conduit 18. Therefore, the memory valve maintains in conduit 36 a varying pressure which is a measure of car speed and this is maintained in chambers 32 and 34 to urge the brake regulator valve stem 28 to the left against governor pressure in chamber 30. As so far described, and under the conditions referred to, both the governor pressure in chamber 17 and the memory valve pressure in chambers 32 and 34 are determined by actual car speed. The forces of these pressures on the valve stem 28 are balanced and leave this stem to be positioned by the spring 30, which then holds the valve stem fully to the right as FIGURE 1 is seen.

I provide means for arresting the memory valve governor plug 60 at any instant to maintain in chambers 32 and 34 a constant pressure which is a measure of desired maximum coasting speed. This is a holding plug 63 which can be held against the governor plug 60 to prevent movement of the governor plug in spite of any changes in car speed. It is held when desired against the releasing force of a return spring 74 by the pressure in a cylinder 76 connected to the brake apply conduit 12. When the arresting plug 63 is set a constant pressure is maintained in chambers 32 and 34 which is an index of the speed of the car at the time the holding plug was set, and this constitutes the measure of the desired maximum coasting speed.

The pressure regulator valve 13 has an inlet port 64 which receives oil from any suitable source of supply at constant pressure, herein illustrated as a conduit 65, which under appropriate conditions under the control of apparatus to be described, is connected to a constant pressure pump 66, herein called a front pump, driven by the engine. Alternatively the conduit 65 may be connected to the rear pump 22. The inlet port 64 can communicate with a regulated pressure chamber 67 under the control of an inlet land 68 urged to the left to close port 64 by the unbalanced forces due to the pressure of oil in a regulating chamber 80, formed between a large diameter land 68 and a small diameter land 82 on stem 28. The regulating chamber 80 is connected to the regulated pressure chamber 67 so that pressures in these two chambers are equal, as is known in pressure regulating valves. Preferably the connection is thru brake apply conduit 12, the brake servo 10 and conduit 84 for purposes which will be explained. When the forces exerted on the valve stem by the pressures in governor chamber 17 and memory valve chambers 32 and 34 are balanced, as above referred to, and the conduit 65 is supplied with oil, the valve stem 28 is held initially by the spring 30 to open port 64, as above described. The valve 13 constitutes a known form of regulating valve which maintains in chamber 67 a predetermined constant pressure fixed by the force of the spring 30. Oil admitted at port 64 exerts pressure in chamber 158 until this pressure reaches the value fixed by the spring 30, when it moves the valve stem 28 to close port 64. If the pressure in chambers 67 and 80 rises above the predetermined value, the unbalanced force in chamber 80 moves the stem 28 to the left against the spring to open slightly an exhaust port 70 to reduce the pressure. On the other hand, if the pressure in chamber 67 falls below the predetermined value, the spring 30 moves the valve stem 28 to the right against the force in chamber 80 to close the exhaust port 70 and open inlet port 64 slightly to increase the pressure. This is the condition when the forces on the valve stem due to governor pressure in chamber 17 and due to memory valve pressure in chambers 32 and 34 are balanced. However, if the force in governor chamber exceeds the sum of the forces in memory valve chambers 32 and 34 on the valve stem 28, then the valve 13 increases the pressure in its regulated pressure chamber 67 and maintains this pressure at a value measured by the excess of memory valve pressure over governor pressure, that is, by the excess of actual speed over predetermined maximum coasting speed, because the force of the pressure in governor chamber 17 is added to the force of spring 30, and increases the pressure at which chamber 80 will crack the vent port 70.

When the memory valve holding plug is set the pressure in the memory valve urges the valve stem 28 to the left with a constant force which is a measure of desired maximum coasting speed. The governor urges the valve stem 28 to the right with a force which is a measure of actual speed. Whenever the actual speed exceeds the set coasting speed the regulator valve stem 28 is moved to the right far enough to close exhaust port 70 and open inlet port 64. If now the controls are set as described below, both to fill supply conduit 65 and to connect brake apply conduit 12 to the brake servo 10, the opening of port 64 will admit oil from the supply line 65 to the chamber 67 which will apply the brake with a force proportional to excess of actual speed over set maximum coasting speed. Application of the brake slows the car and reduces the governor pressure in chamber 17 which permits the valve stem to move to the left again closing the inlet port 64 and opening slightly the exhaust port 70. This valve, like the memory valve, fluctuates between one position in which the entry port is slightly opened and the exhaust port is closed, and a second position in which the exhaust port is opened slightly and the entry port is closed, thus functioning as a regulator to maintain in the chamber 67 and the brake servo 10 a variable pressure which applies the brake with a force which is measured by the excess of actual speed over chosen coasting speed. If the actual speed drops below set maximum coasting speed, the force of governor pressure in chamber 17 is reduced below the force of memory valve pressure in chambers 32, 34 so that the valve 28 is moved to the left far enough to close port 64 and open exhaust port 70, which empties chamber 67 and brake apply line 12 and prevents application of the brake, and releases the holding plug 63 of the memory valve.

I provide means for preventing operation of the braking system at the will of the driver, and I also provide means for automatically preventing operation of the braking system when the car is being driven by the engine. The primary control for so preventing the operation of the brake is a brake relay valve 100, which can be controlled jointly by the manual valve 14 and by the throttle relay valve 16. Control oil is supplied to the brake relay valve by a conduit 102 which, thru the manual valve 14, may be connected with the front pump 66 to supply constant pressure oil to a relay actuating chamber 103 in valve 100, where the pressure urges to the left a relay valve stem 104 against the restoring force of a spring 106. Chamber 103 is also the oil supply to the relay valve itself. A conduit 108 conducts constant pressure oil from the chamber 103 to an inlet port 110 which admits oil to relay chamber 112 when permitted by a land 114 on the valve stem 104. When control oil is admitted to chamber 103 it can move the valve stem 104 all the way to the left against the spring 106 so that land 116 closes exhaust port 118 and land 114 fully opens inlet port 110 to admit control oil to relay chamber 112 and hence to line 65 which constitutes the sole supply of brake apply oil to the brake apply and regulating valve 13.

Figure 4:
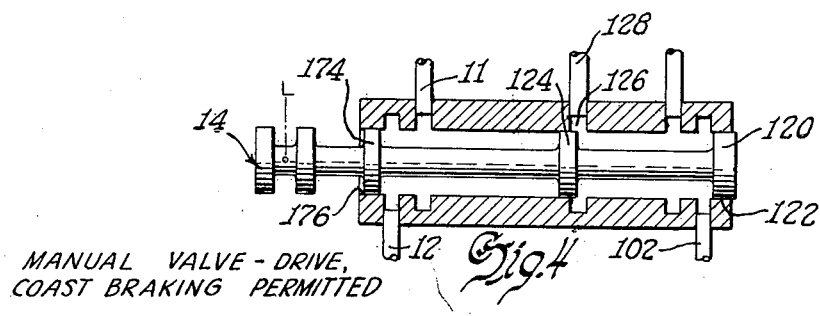

The relay valve 100 is also controlled by the manual valve 14 to prevent operation of the brake at the will of the driver. FIG. 4 shows the manual valve in the position to permit braking. In this position land 120 closes an exhaust port 122 and land 124 opens port 126 establishing communication between the front pump main 128 and the brake relay valve supply line 102 which moves the relay valve stem to the left and supplies oil to the brake regulator valve 13. The brake cannot be operated with the manual valve 14 in any other position because in all positions other than FIG. 4 the land 120 or the land 124 interrupts communication between the front pump main line 128 and the brake relay valve supply conduit 102 and exhaust port 122 is opened to drain the conduit 102.

Even when the manual valve 14 is set to permit braking I do not want the coasting brake to operate when the engine is driving the car. To this end I provide the throttle relay valve 16 which, whenever the engine throttle is open to drive the car, directs a lockout pressure to close the brake relay valve 100 and prevent operation of the brake. FIG. 1 shows the throttle relay valve 16 in position to permit braking, it being so placed by any suitable linkage, not shown, whenever the throttle is closed. In this position a land 134 covers an inlet port 136 to prevent communication between the front pump main line 128 and line 140 leading to the lock-out chamber 142 in brake relay valve 100 at the left end of the valve stem 104 and land 130 opens exhaust port 132 to drain the chamber 142. Whenever the throttle relay valve is in this position main line pressure in chamber 103 of the brake relay valve overcomes spring 106 and opens the relay valve to permit operation of the brake. But, whenever the throttle is opened linkage not shown moves the throttle relay valve slightly to the right from the position shown in FIG. 1, so that the land closes exhaust port 132 and land 134 opens port 136 to admit main line pressure to the lock-out chamber 142 of the brake relay valve 100. Main line pressure in chamber 142 balances the pressure in chamber 103 and spring 106 closes the brake relay valve to prevent operation of the brake.

If desired the brake may be cooled by circulating coolant over or through it when it is applied. This is done by conducting oil to the brake cooling space, as represented in FIG. 1 by the space labeled brake coolant. Cooling oil is supplied from a coolant supply conduit 150 leading from the pumps through a second relay chamber 152 in brake relay valve. Whenever the brake relay valve is open the land 154 establishes communication between the line 150 and the brake coolant chamber. The pressure of the coolant oil may be reduced to any desired value by the spring-loaded pressure-reducing valve 156.

*Operation*

Suppose the manual valve 14 is set to permit braking, as in FIG. 4, and the engine is driving the car: The throttle relay valve 16 is open, directing lock-out pressure to the brake relay valve and preventing control oil from reaching the brake apply valve 13. Since no oil reaches valve 13 there is no pressure in brake apply conduit 12 and the memory valve arresting plug cannot be set. Under these conditions governor pressure and memory valve regulating pressure are both measured by actual car speed and the brake pressure regulator valve stem 28 is balanced between the two pressures. When so balanced the valve stem is held fully to the right in FIGURE 1 by spring 30 so that inlet port 64 is open and exhaust port 70 closed.

Now suppose the operator wishes to set a maximum coasting speed: He merely releases the throttle pedal. The throttle relay valve 16 now closes, exhausting the lock-out chamber 142 of brake relay valve 100, which now opens to supply oil to conduit 65 to opened port 64 in regulator valve 13 and to pressure chamber 67. This admits oil to brake apply conduit 12, which sets memory plug 63, fills brake servo 10 and through line 84 leading from the brake servo 10, fills regulating chamber 80 of pressure regulating valve 13. This pressure initially is low because determined by spring 30. It is sufficient to hold plug 63 but is not sufficient to overcome the normal force of the customary brake return spring associated with brake 10 and shown as reverse reaction brake 60 in Patent 2,865,227 referred to.

The apparatus is now set for applying the coasting brake whenever, and only when, actual coasting speed exceeds set maximum coasting speed. When this occurs the increased governor pressure in chamber 17 opens port 64 of the regulator valve and maintains a brake apply pressure, as explained above, measured by excess of actual speed over desired coasting speed.

If the car continues to increase in speed after application of the brake the governor pressure increases in governor chamber 17 of the regulating valve 13 and increases the brake apply pressure. If the car speed is reduced slightly below the maximum set coasting speed, pressure in the brake apply line may be reduced to a value which is too low to apply the brake against its return spring, but is sufficient to keep line 12 filled and memory plug 63 set. If, thereafter speed should again increase above the desired coasting speed the brake is set as before. However if the actual car speed is reduced more than a predetermined amount below maximum set coasting speed, the memory valve pressure in chambers 32 and 34 will move the valve stem 28 fully to the left and empty the brake line 65, preventing application of the brake, as explained above. This will also release the holding plug 63 so that the forces in chambers 17, 32 and 34 will be balanced and the valve stem 28 will be held by spring 30 to close exhaust port 70 and open intake port 64 as explained above. The sizes of the various lands of the regulating valve 13 and the force of the return spring 30 and of the brake return spring, and the pressures developed by the governor in response to various car speeds can be adjusted to retain the memory plug 63 set throughout any desired range of actual speed below desired maximum coasting speed. The above conditions continuously provide for such braking of the car as may be required over a long drive down grades of varying slope.

Whenever it is desired to change the set maximum coasting speed, the operator brings the speed of the car to the new desired coasting speed with the throttle open, slowing the car with service brakes, if necessary, and then closes the throttle. This sets the memory plug 63 at a new coasting speed at or below which the control maintains the car, as before explained. To remove braking control entirely the operator merely holds the throttle open to the desired degree to give the desired driving speed. This locks out the brake relay valve 100 to prevent operation of the brake. Alternatively the driver moves the manual valve to the high-speed drive position of FIG. 3. This bleeds the brake relay valve 100 to prevent operation of the brake. It is noted that in both conditions in which the car is running but braking is prohibited (that is in either the high drive condition or advanced throttle condition) the brake control valve 13 receives both governor pressure and memory valve pressure. This permits immediate setting of maximum coasting speed by closing the throttle, and, if necessary, moving the manual valve.

It is immaterial as far the brake is concerned whether the supply and control pressure are obtained from the front pump or the rear pump. When the brake is used on a car having a hydraulically controlled transmission there are advantages in having certain of the transmission controls operated from a pump driven by the engine, and where this is the case it is convenient to have certain of the brake controls operated from this front pump. Even in such cases, however, I provide means for assuring operating and control pressure if the engine fails. To this end, I connect the delivery lines of both pumps by a passage 160 controlled by a check valve 162 arranged, as shown in FIG. 1, so that when ever pressure in the front pump delivery line 128 is less than in the rear pump delivery line 24 (for example, if the engine is not running) the rear pump supplies oil to the system which is connected to the front pump. However, if the rear pump pressure is not greater than the front pump pressure (for example, when the car is not running) front pump cannot supply oil to that part of the system which is peculiar to the rear pump.

Figure 2:
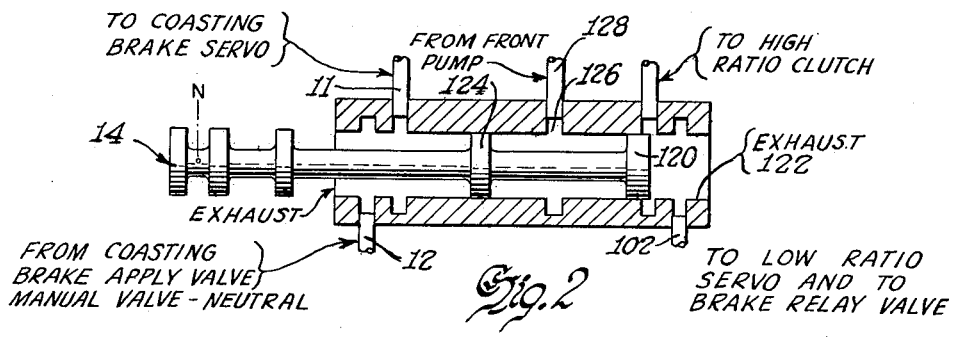
FIG. 2 is a schematic diagram of a manually operated combined transmission and brake control valve in neutral position.
Figure 3:
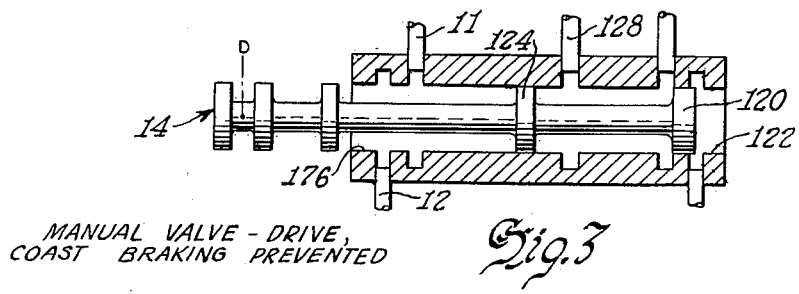
FIG. 3 shows the valve of FIG. 2 in one drive position which prevents operation of the coasting brake and FIG. 4 shows the same valve in another drive position which permits operation of the brake.

The invention is illustrated as applied to a car having a hydraulically controlled transmission which may be controlled by the manual valve 14 to provide neutral or no drive, designated N in FIGS. 1 and 2; to provide drive at high gear ratio, designated D in FIGS. 1 and 3, in which operation of the brake is prevented; and to provide drive in low gear ratio in which operation of the brake is permitted, designated L in FIGS. 1 and 4. A parking and a reverse drive position may also be provided in which the coasting brake does not operate. Such transmission, for example, may be that shown in the patent issued to Plexico and me, referred to above.

When the manual valve is in the position of FIG. 3 set to drive but prevent coast braking, high-speed drive may be established by a direct drive clutch represented in FIG. 1 by the legend high ratio clutch. Low-speed drive is prevented by land 120 which cuts off the supply of control oil to the low speed control, and also cuts off the braking control, as explained.

When the manual valve is in the low drive position shown in FIG. 4 control oil is admitted from the line 128 to the brake relay valve control line 102, from which a branch line 170 simultaneously conducts control oil to the pressure chamber 172 of a low ratio apply servo which establishes low ratio drive. When this occurs, high ratio drive is prevented by any suitable known means, not shown.

In the Patent 2,865,227, referred to, there is a planetary combined reduction and reverse drive in which low gear drive is established by setting one band, and reverse is established by setting another band to hold a selected reaction gear. Whenever the transmission is in forward drive the reverse drum spins freely. This makes a convenient brake for the vehicle brake 10 of the present invention. If such reverse band is used for the coasting brake it is important that the brake servo must not be connected to exhaust, as in FIG. 1, when the transmission is set in reverse drive. Therefore, when the manual valve is set to the reverse drive position the land 124 is in the bore of the manual valve body and to the right of the position shown in FIG. 4 so that it cuts off communication between the brake servo 10 and both the exhaust port 176 and the brake apply line 12. The brake conduit 11 is now in communication with line 128 through the manual valve, land 124 being to the right of the position shown in FIG. 4. This permits the brake 10 to establish reverse drive, but prevents its operation as a coasting brake.

I claim:

1. In a control system for limiting the speed of a vehicle, a fluid pressure source, a manually operable drive range selector valve adapted to be positioned to select a plurality of transmission drive ratios, a fluid pressure responsive brake servo, a pressure regulator valve for controlling the supply of fluid pressure to said brake servo, valve means controlled by said drive range selector valve effective in one position of said drive range selector valve to admit fluid pressure to said pressure regulator valve, and an additional valve for controlling said valve means, said additional valve being effective in one position to permit said valve means to deliver fluid pressure to said pressure regulator valve and effective in all other positions to position said valve means to connect said pressure regulator valve to exhaust.

2. In a control system for limiting the speed of a vehicle, in combination, a transmission servo actuatable to establish reverse drive, a transmission servo actuatable to establish reduction drive, a fluid pressure source, a manually operable drive range selector valve adapted to be positioned to select a plurality of drive ranges of transmission operation including reduction drive, a pressure regulator valve for controlling the pressure level of fluid pressure supplied to said reverse servo, a control valve in the circuit connecting said pressure regulator valve to said drive range selector valve, said drive range selector valve being effective in its low range position to direct pressure fluid to said reduction drive servo to establish reduction drive, and also being effective in its low range position to position said control valve to admit pressure fluid to said pressure regulator valve to apply said reverse servo, and an accelerator pedal controlled valve effective throughout a range of movement to direct fluid pressure to said control valve, said control valve being movable in response to fluid pressure delivered by said accelerator pedal controlled valve to connect said pressure regulator valve to exhaust to release said reverse brake servo.

3. In a control system for a vehicle speed limiting mechanism, a transmission servo actuatable to establish reduction drive, a transmission brake servo actuatable to establish reverse drive, a fluid pressure source, a drive range selector valve adapted to be positioned to select a plurality of drive ranges of operation including reduction drive, a brake pressure regulator valve for controlling the pressure level of fluid pressure supplied to said reverse servo, a speed responsive governor for directing a variable pressure to said brake pressure regulator valve, a pressure regulator valve controlled by said governor for delivering a variable pressure to said brake pressure regulating valve, means responsive to pressure delivered by said brake pressure regulating valve for fixing the pressure level of fluid pressure delivered by said pressure valve at a given value, a control valve intermediate said drive range control valve and said brake pressure regulator valve yieldably biased to connect said brake pressure regulator valve to exhaust, said drive range control valve being effective in its reduction drive position to direct pressure to said reduction drive servo to establish reduction drive and also being effective to direct pressure to said control valve to position said control valve to connect said brake pressure regulator valve to said fluid pressure source, and an accelerator pedal controlled valve effective to position said control valve to connect said brake pressure regulator valve to exhaust whenever said accelerator pedal is moved from a throttle closing to a throttle opening position for releasing said reverse brake servo.

4. In a control system for limiting the speed of a vehicle, a fluid pressure source, a fluid pressure responsive brake actuating servo, a drive range selector valve operable to selectively establish direct drive or reduction drive, valve means controlled by said drive range selector valve normally effective to deliver fluid coolant to said brake when said drive range selector valve is positioned to select reduction drive, and an accelerator pedal controlled valve operable to position said valve means to block off the supply of coolant to said brake when said accelerator pedal is moved from a throttle closing to a throttle opening position.

5. In a control system for limiting the speed of a vehicle, a fluid pressure source, a fluid pressure responsive brake actuating servo, a drive range selector valve operable to selectively establish direct drive or reduction drive, a brake pressure regulator valve normally effective to deliver a variable pressure to said brake servo when said drive range selector valve is positioned to select reduction drive, an additional valve normally operative to supply fluid pressure to said brake pressure regulator valve and to supply fluid coolant to said brake when said drive range selector valve is positioned to select reduction drive, and an accelerator pedal controlled valve effective to position said additional valve to block off the supply of fluid to said brake pressure regulator valve and to exhaust the fluid coolant from said brake when said accelerator pedal is moved from a throttle closing to a throttle opening position.

6. A braking system for vehicles comprising in combination a brake adapted to oppose motion of the vehicle, a pressure operated servo for variably applying the brake and adapted to be connected to a source of pressure through a fluid pressure actuated control valve adapted to vary the pressure in the servo, fluid pressure operated means supplied with variable governing fluid pressure measured by the speed of the vehicle for urging the valve in the direction to apply the brake, a second pressure-operated means supplied with a fixed fluid pressure for urging the valve in the direction to prevent applying the brake, the valve being adapted to be positioned to connect the servo to the source when the governing pressure exceeds the fixed pressure and to vary the pressure in the servo in accordance with the amount of such excess.

7. A braking system for vehicles comprising in combination a brake and means for applying the brake including a control member, means for exerting in one direction on the control member a first variable force which is measured by the speed of the vehicle, means for exerting in the opposite direction on the control member a second variable force which is measured by the speed of the vehicle, and means operable by the driver of the vehicle for preventing variations in the second force and thereby thereafter exerting a force on the control member which remains constant during variations of the first force, the control member being responsive to excess of the first force over constant force for applying the brake.

8. A braking system for a vehicle comprising in combination a brake, a control member, means for urging the control member in one direction with a first force which varies with the speed of the vehicle, means for urging the control member in the opposite direction with a second force which varies with the speed of the vehicle, means for setting the second force at a value which remains constant during variations of the first force, and means for applying the brake in response to excess of the first force over the constant value of the second force.

9. A braking system for a vehicle driven by a throttle controlled engine comprising in combination a brake, a control member, means for urging the control member in one direction with a first force which varies with the speed of the vehicle, means for urging the control member in the opposite direction with a second force which varies with the speed of the vehicle, means responsive to the position of the throttle for setting the second force at a constant value which remains constant during variations of the first force, and means for applying the brake in response to excess of the first force over the fixed value of the second force.

10. A braking system for a vehicle comprising in combination a pressure actuated valve for applying a brake, means urging the valve in one direction with a governing force which is measured by vehicle speed, pressure operated means urging the valve in the opposite direction and receiving fluid from a pressure regulating valve, means controlling the regulating valve to maintain in said pressure operated means a pressure measured by vehicle speed and means for arresting the controlling means to maintain a constant pressure in the pressure operated means.

11. A braking system for a vehicle driven by a throttle-controlled engine comprising in combination a pressure actutaed valve for applying a brake, means urging the valve in one direction with a governing force which is measured by vehicle speed, pressure operated means urging the valve in the opposite direction and receiving fluid from a pressure regulating valve, means controlling the regulating valve to maintain in said pressure operated means a pressure measured by vehicle speed and means responsive to the position of the throttle for arresting the controlling means to maintain a constant pressure in the pressure operated means.

12. A braking system for a vehicle comprising in combination a source of pressure; a regulator having a pressure regulating chamber, a valve adapted when open to admit fluid from the source to the chamber, pressure operated means connected to the chamber urging the valve closed, a spring urging the valve open and a movable abutment for regulating the force of the spring; means responsive to the speed of the vehicle for moving the abutment to maintain in the chamber a pressure which is a measure of vehicle speed; and means operable by the driver for preventing movement of the abutment regardless of change of speed of the vehicle.

13. A braking system for a vehicle driven by a throttle-controlled engine comprising in combination a source of pressure; a regulator having a pressure regulating chamber, a valve adapted when open to admit fluid from the source to the chamber, pressure operated means connected to the chamber urging the valve closed, a spring urging the valve open and a movable abutment for regulating the force of the spring; means responsive to the speed of the vehicle for moving the abutment to maintain in the chamber a pressure which is a measure of vehicle speed; and means responsive to the position of the throttle for preventing movement of the abutment.

14. A braking system for a vehicle comprising in combination a pressure operated servo for applying a brake when connected to a source of fluid under pressure, a pressure regulating valve having an outlet connected to the servo and having an inlet adapted to be connected to the source and having a regulated pressure chamber adapted to be connected to the inlet, means responsive to vehicle speed for urging the valve in the direction to connect the chamber to the inlet, means which is a measure of a predetermined maximum coasting speed for urging the valve in the direction to disconnect the chamber from the inlet, the valve being adapted when the chamber is connected to the source to maintain in the servo a pressure which is measured by excess of actual speed of the vehicle over predetermined maximum coasting speed, and means operable by the driver for establishing or interrupting connection between the chamber and the source.

15. A braking system for a vehicle comprising in combination a brake for opposing motion of the vehicle, a pressure operated servo for applying the brake when connected to a source of fluid under pressure through a control valve having an outlet connected to the servo and having an inlet adapted to be connected to the source, means for urging the valve in the direction to open the inlet by a governing force which is measured by vehicle speed, means for urging the valve in the direction to close the inlet with a fixed force, and means for holding the valve open when the forces are equal.

16. A braking system for a vehicle comprising in combination a brake for opposing motion of the vehicle, a pressure operated servo for applying the brake when connected to a source of fluid under pressure through a control valve having an outlet connected to the servo and having an inlet, adapted to be connected to the source, means for urging the valve in the direction to open the inlet by a governing force which is measured by vehicle speed, means for urging the valve in the direction to close the inlet with a fixed force, and a biasing spring for holding the valve open when the forces are equal.

17. A braking system for a vehicle comprising in combination a pressure operated servo for applying a brake when connected to a source of fluid under pressure through a control valve having an outlet connected to the servo and having an inlet adapted to be connected to the source, means for continuously urging the valve in the direction to open the inlet by a governing force which is measured by vehicle speed, means for urging the valve in the direction to close the inlet with an opposing force which is measured by vehicle speed, means operable by the driver of the vehicle for fixing the opposing force at a constant value, means for holding the valve open when the forces are equal, and means operable by the driver for establishing or interrupting communication between the source and the inlet.

18. A braking system for a vehicle comprising in combination a pressure operated servo for applying a brake when connected to a source of fluid under pressure through a control valve having an outlet connected to the servo and having an inlet, adapted to be connected to the source, means for continuously urging the valve in the direction to open the inlet by a governing force which is measured by vehicle speed, means for urging the valve in the direction to close the inlet with an opposing force which is measured by vehicle speed, means for holding the valve open when the forces are equal, and means operable by the driver for fixing the opposing force at a constant value and for establishing communication between the source and the inlet.

19. A braking system for a vehicle driven by a throttle-controlled engine comprising in combination a pressure operated servo for applying a brake when connected to a source of fluid under pressure through a control valve having an outlet connected to the servo and having an inlet, adapted to be connected to the source, means for continuously urging the valve in the direction to open the inlet by a governing force which is measured by vehicle speed, means for urging the valve in the direction to close the inlet with an opposing force which is measured by vehicle speed, means for holding the valve open when the forces are equal, and means responsive to the position of the throttle for fixing the opposing force at a constant value and for establishing communication between the source and the inlet.

20. A braking system for a vehicle driven by a throttle-controlled engine comprising in combination a pressure operated servo for applying a brake when connected to a source of fluid under pressure through a control valve having an outlet connected to the servo and having an inlet adapted to be connected to the source, means for continuously urging the valve in the direction to open the inlet by a governing force which is measured by vehicle speed, means for urging the valve in the direction to close the inlet with an opposing force which is measured by vehicle speed, means for holding the valve open when the forces are equal, means responsive to the position of the throttle for fixing the opposing force at a constant value and for establishing communication between the source and the inlet and means responsive to the establishment of communication between the source and inlet for maintaining the fixing means.

21. A braking system for a vehicle driven by a throttle-controlled engine comprising in combination a pressure operated servo for applying a brake when connected to a source of fluid under pressure through a control valve having an outlet connected to the servo and having an inlet adapted to be connected to the source, means for continuously urging the valve in the direction to open the inlet by a governing force which is measured by vehicle speed, means for urging the valve in the direction to close the inlet with an opposing force which is measured by vehicle speed, means for holding the valve open when the forces are equal, means responsive to the position of the throttle for fixing the opposing force at a constant value and for establishing communication between the source and the inlet and means responsive to pressure in the servo for maintaining the fixing means.

22. A braking system for a vehicle comprising in combination a pressure operated servo for applying a brake when connected to a source of fluid under pressure through a control valve having an outlet connected to the servo and having an inlet, means for urging the valve in the direction to open the inlet with a governing force which is measured by the speed of the vehicle, means for urging the valve in the direction to close the inlet with an opposing force which is measured by vehicle speed, means operable by the driver for connecting the source to the inlet, means responsive to connection of the source to the inlet for fixing the opposing force at a constant value.

23. In combination in a control system for a brake mechanism for limiting the speed of a vehicle, a brake which variably opposes motion of the vehicle, a fluid pressure responsive chamber which actuates said brake, a fluid pressure source, a pressure regulator valve which supplies fluid at varying pressure to said brake chamber, and means for controlling said pressure regulator valve to vary the pressure of fluid supplied to the chamber including a second pressure regulator valve adapted to deliver a fixed signal pressure to urge said first-mentioned pressure regulator valve to move in one direction and a vehicle speed responsive governor adapted to deliver a variable signal pressure to urge said first-mentioned pressure regulator valve to move in the opposite direction.

24. The combination set forth in claim 23 including means for rendering said brake actuating servo ineffective to actuate said brake mechanism except when said vehicle is coasting.

25. In a control system for limiting the speed of a vehicle, a brake adapted variably to oppose motion of the vehicle, a fluid pressure responsive brake actuating servo adapted to be connected to a fluid pressure source thru a brake pressure regulator valve adapted to vary the pressure delivered to the servo, a second pressure regulator valve adapted to deliver a fixed pressure to said brake pressure regulator valve and means for delivering a variable pressure measured by vehicle speed to said brake pressure regulator valve, said fixed and variable pressures acting upon said brake pressure regulator valve in opposition to each other to determine the pressure of fluid supplied by said brake pressure regulator valve to said brake actuating servo.

26. The combination set forth in claim 25 including means for rendering said brake actuating servo ineffective to limit the speed of the vehicle except when said vehicle is coasting.

27. In a control system for limiting the speed of a vehicle, a fluid pressure responsive brake actuating servo adapted to be connected to a fluid pressure source thru a brake pressure regulator valve which determines the pressure of fluid supplied to said brake servo, first valve means for delivering a variable pressure to urge said pressure regulator valve to move in one direction, additional valve means for delivering a variable pressure to urge said pressure regulator valve to move in the opposite direction, said pressures acting on the brake pressure regulator valve in opposition to vary the pressure supplied by the brake pressure regulator valve to the brake servo, and means for fixing the pressure of fluid delivered by said first valve means, the regulator valve being adapted, when the pressure delivered by the first valve is fixed, to vary the pressure delivered to the servo a pressure which varies with the variable pressure of the additional valve means.

28. In a control system for limiting the speed of a vehicle, a fluid pressure source adapted to be connected to a fluid pressure responsive brake actuating servo thru a brake pressure regulator valve which determines the pressure of fluid supplied to said brake servo, means including a second pressure regulating valve adapted to deliver a variable pressure which varies in accordance with vehicle speed to said brake pressure regulator valve, additional means for delivering an opposing variable pressure which varies in accordance with vehicle speed to said brake pressure regulator valve, and means for fixing the pressure of fluid delivered by the second pressure regulating valve at a given value.

29. In a control system for limiting the speed of a vehicle, a fluid pressure source adapted to be connected to a fluid pressure responsive brake actuating servo thru a brake pressure regulating valve which determines the pressure of fluid supplied to said brake servo, a vehicle speed responsive governor adapted to deliver to said brake pressure regulator valve a pressure which is responsive to vehicle speed, an additional pressure regulator adapted to deliver to said brake pressure regulator valve and in opposition to said governor a pressure which is also responsive to vehicle speed, and means for fixing the pressure delivered by the additional regulator valve.

30. In a control system for limiting the speed of a vehicle, a fluid pressure source adapted to be connected to a fluid pressure responsive brake actuating servo thru a brake pressure regulator valve which determines the pressure of fluid supplied to said brake servo, a vehicle speed responsive governor adapted to deliver to said brake pressure regulator valve fluid at a pressure which is measured by vehicle speed, a second pressure regulating valve controlled by said governor to deliver to the brake pressure regulator valve fluid at a variable opposing pressure measured by vehicle speed, and means controlled by pressure of fluid delivered by said brake pressure regulator valve for fixing the pressure of fluid delivered by said second regulating valve irrespective of changes of vehicle speed.

31. In a control system for limiting the speed of a vehicle, a fluid pressure source adapted to be connected to a fluid pressure responsive actuating brake servo thru a brake pressure regulator valve which determines the pressure of fluid delivered to said brake servo, a vehicle speed responsive governor adapted to deliver a pressure varying with vehicle speed to said brake pressure regulator valve, a second pressure regulating valve controlled by said governor adapted to deliver an opposing pressure varying with vehicle speed to said brake pressure regulator valve, means for fixing the pressure of fluid delivered by said second pressure regulating valve at a given value corresponding to a given vehicle speed and additional control means operable to render said fixing means ineffective to thereby permit said pressure regulating valve to deliver a different fluid pressure corresponding to a different vehicle speed.

32. In a control system for limiting the speed of a vehicle driven by an engine controlled by a throttle, a fluid pressure source adapted to be connected to a fluid pressure controlled brake actuating servo thru a brake pressure regulator valve which controls the pressure of fluid delivered to said brake servo, a speed responsive governor adapted to deliver a pressure varying with vehicle speed to said brake pressure regulator valve, a pressure regulating valve controlled by said governor adapted to deliver an opposing pressure varying with vehicle speed to said brake pressure regulator valve, means for fixing the pressure level of fluid pressure delivered by said pressure regulating valve at a given value, and means controlled by the throttle for rendering said fixing means ineffective when the throttle is opened.

33. In a control system for limiting the speed of a vehicle driven by an engine controlled by a throttle, a fluid pressure source adapted to be connected to a fluid pressure responsive brake actuating servo thru a brake pressure regulator valve which determines the pressure of fluid supplied to said brake servo, a speed responsive governor adapted to deliver a pressure varying with vehicle speed to said brake pressure regulator valve, a second pressure regulating valve controlled by said governor adapted to deliver pressure varying with vehicle speed to said brake pressure regulator valve, means operable by the driver of the vehicle for fixing at a constant value the pressure of the second valve, said pressures acting upon said brake pressure regulator valve in opposition to each other to control the pressure delivered by said brake pressure regulator valve, and means including a valve controlled by the throttle for preventing the supply of fluid from said source to said brake pressure regulator valve when the throttle is opened.

34. In a control system for limiting the speed of a vehicle, a fluid pressure source, a drive range selector valve adapted to be positioned to select a plurality of transmission drive ratios, a fluid pressure responsive brake servo, a pressure operated valve for controlling the admission of fluid pressure to said brake servo, a control valve in the circuit between said drive range selector valve and said pressure operated valve, means yieldably biasing said control valve to connect said pressure operated valve to exhaust, said control valve being responsive to pressure delivered by said drive range selector valve to admit fluid pressure to said pressure operated valve when said drive range selector valve is positioned to select one drive ratio, and a manually operable overcontrol valve for positioning said control valve to connect said pressure operated valve to exhaust irrespective of the position of said drive range selector valve.

35. In a control system for limiting the speed of a vehicle driven by a throttle controlled engine thru a plural ratio transmission, a fluid pressure source, a drive range selector valve adapted to be positioned to select a plurality of transmission drive ratios, a fluid pressure responsive brake servo, a pressure operated valve for controlling the admission of fluid pressure to said brake servo, a control valve in the circuit between said drive range selector valve and said pressure operated valve, spring means biasing said control valve to connect said pressure operated valve to exhaust, said control valve including means responsive to pressure delivered by said drive range selector valve for positioning said control valve to admit fluid pressure to said pressure operated valve when said drive range selector valve is positioned to select a predetermined transmission drive ratio, and a throttle-controlled valve operable to deliver fluid pressure to said control valve to position said control valve to connect said pressure operated valve to exhaust irrespective of the position of said drive range selector valve.

36. A braking system for a vehicle driven by a throttle-controlled engine comprising in combination a pressure operated servo for applying a brake when connected to a source of fluid under pressure through a pressure regulating valve having an outlet connected to the servo and having an inlet adapted to be connected to the source and having a regulated pressure chamber adapted to be connected to the inlet, means responsive to vehicle speed for urging the valve in the direction to connect the chamber to the inlet, means which is a measure of a predetermined maximum coasting speed for urging the valve in the direction to disconnect the chamber from the inlet, the valve being adapted when the chamber is connected to the source to maintain in the servo a pressure which is measured by excess of actual speed of the vehicle over a predetermined maximum coasting speed, and means responsive to the position of the throttle for establishing or interrupting connection between the chamber and the source.

37. A braking system for a vehicle driven by a throttle-controlled engine comprising in combination a brake for opposing motion of the vehicle, fluid pressure operated means for applying the brake, a source of pressure fluid, a valve for selectively establishing and interrupting communication between the source and the brake, means responsive to the speed of the vehicle for urging the valve to establish communication, means for urging the valve to interrupt communication with a force measured by a predetermined fixed speed of the vehicle, means operable by the driver for connecting the source to the valve, and means responsive to opening the throttle for interrupting communication between the source and the valve when the driver-operated means has connected the source to the valve.

38. A braking system for vehicles comprising in combination; a vehicle brake; a source of fluid under pressure; an expansible fluid pressure motor which applies the brake; a pressure regulating valve which connects the source to the motor and which varies the pressure in the motor, the valve including a first chamber adapted to be connected to the source, a valve member, means for urging the valve member in one direction to increase the pressure in said first chamber, and a second pressure chamber for urging the valve member to move in the opposite direction to reduce the pressure in the first chamber; a conduit connecting the first chamber to the brake motor; and a second conduit connecting the brake motor to the second chamber.

39. In a control system for limiting the speed of a vehicle driven by an engine through a plural ratio transmission, a torque-establishing device for establishing drive through the transmission at one ratio, a fluid pressure drive chamber for operating the torque-establishing device, a fluid pressure source, means for selectively connecting or disconnecting the chamber and the source, a brake for opposing motion of the vehicle, a fluid pressure brake chamber for applying the brake, a valve having a fluid pressure inlet and which selectively connects or disconnects the brake chamber to said inlet, and a relay valve operated by the pressure of fluid in the drive chamber for connecting said inlet to the source.

40. In a control system for limiting the speed of a vehicle driven by an engine through a plural ratio transmission, a torque-establishing device for establishing drive through the transmission at one ratio, a fluid pressure drive chamber for operating the torque-establishing device, a fluid pressure source, means for selectively connecting or disconnecting the chamber and the source, a brake for opposing motion of the vehicle, a second fluid pressure brake chamber for applying the brake, a fluid pressure regulating valve having a fluid pressure inlet and which supplies fluid at varying pressure to the brake chamber when the inlet is connected to the source, and a relay valve operated by the pressure of fluid in the drive chamber for connecting said inlet to the source.

41. In a driving and braking system for motor vehicles, in combination, a torque-establishing device including a member which establishes reverse drive when held and which rotates whenever the vehicle is moving forward, a brake for said member, a fluid pressure chamber which operates the brake, a first source of fluid under pressure, a second source of fluid under pressure which varies, means for connecting the chamber to the first source to establish reverse drive, and means for connecting the chamber to the second source to establish variable braking of the vehicle.

42. In a driving and braking system for motor vehicles, in combination, a torque-establishing device including a member which establishes reverse drive when held and which rotates whenever the vehicle is moving forward, a brake for said member, a fluid pressure chamber which operates the brake, a first source of fluid under pressure, a second source of fluid under pressure which varies, means for connecting the chamber to the first source to establish reverse drive, means for connecting the chamber to the second source to establish variable braking of the vehicle, and means which disconnects the chamber from the second source when the speed of the vehicle is below a predetermined value.

43. In a driving and braking system for motor vehicles, in combination, a torque-establishing device including a member which establishes reverse drive when held and which rotates whenever the vehicle is moving forward, a brake for said member, a fluid pressure chamber which operates the brake, a first source of fluid under pressure, a second source of fluid under pressure, means for connecting the chamber to the first source to establish reverse drive, means for connecting the chamber to the second source to establish braking of the vehicle, and means responsive to the speed of the vehicle which varies the pressure of the second source to vary the braking effort.

44. In a driving and braking system for motor vehicles, in combination, a torque-establishing device including a member which establishes reverse drive when held and which rotates whenever the vehicle is moving forward, a brake for said member, a fluid pressure chamber which operates the brake, a first source of fluid under pressure, a second source of fluid under pressure, means for connecting the chamber to the first source to establish reverse drive, means for connecting the chamber to the second source to establish braking of the vehicle, means responsive to the speed of the vehicle which varies the pressure of the second source and thereby varies the braking effort, and means which disconnects the chamber from the second source when the speed of the vehicle is below a predetermined value.

45. In a braking system for vehicles a brake for opposing motion of the vehicle and means for applying the brake with a force measured by the excess of actual vehicle speed over a predetermined control speed including in combination control means, means for exerting on the control means a variable governor force, means responsive to vehicle speed for adjusting the variable force progressively throughout a substantial range of vehicle speed from a minimum value at low speed to a maximum value at high speed so that the force is continuously measured by vehicle speed, and means for exerting on the control means a fixed control force measured by a predetermined control speed in opposition to the governor force, the control means including means responsive to excess of the governor force over the control force for applying the brake with a force measured by the excess of governor force over the control force.

46. A braking system for vehicles comprising in combination a fluid pressure motor for applying a brake, a source of pressure, a pressure regulating valve for connecting the motor to the source and for determining the value of the pressure in the motor, means for urging the valve in the direction to increase the pressure in the motor with a variable governor force, means responsive to vehicle speed for continuously adjusting the governor force progressively throughout a substantial range of vehicle speed from a minimum value at low speed to a maximum value at high speed so that the governor force is continuously measured by the speed of the vehicle, and means for urging the valve in the direction to decrease the pressure in the motor with a constant control force measured by a predetermined control speed, the valve including means for establishing brake apply pressure in the motor from the source when the governor force exceeds the control force and for maintaining the pressure in the motor at a value measured by the excess of governor force over control force.

47. In a braking system for vehicles a brake for opposing motion of the vehicle, and means for applying the brake in response to excess of actual vehicle speed over a predetermined control speed, said means including in combination a control member, means for exerting on the control member a variable governor force, means responsive to vehicle speed for continuously adjusting the governor force progressively throughout a substantial range of vehicle speed from a minimum value at low speed to a maximum value at high speed so that the governor force is continuously measured by vehicle speed, and means for exerting on the control member a constant control force measured by a predetermined control speed in opposition to the governor force, the control member including means responsive to excess of the governor force over the control force for applying the brake.

48. In a braking system for vehicles a fluid pressure motor for applying a brake for opposing motion of the vehicle, a source of fluid pressure, a brake apply valve for selectively establishing or preventing the establishment of brake apply pressure from the source in the motor, means for urging the valve in the direction to establish brake apply pressure in the motor, means responsive to vehicle speed for continuously adjusting the urging means by progressively increasing throughout a substantial range of vehicle speed from a minimum value at low speed to a maximum value at high speed the force exerted by the urging means so that the force is continuously measured by vehicle speed, means for urging the valve in the direction to prevent the establishment of brake apply pressure from the source to the motor with a constant force measured by a predetermined control speed, the valve including means establishing brake apply pressure in the motor when the actual vehicle speed exceeds the predetermined control speed.

References Cited in the file of this patent

UNITED STATES PATENTS

| | | |
|---|---|---|
| 1,519,963 | Harrigan | Dec. 16, 1924 |
| 1,609,782 | Small et al. | Dec. 7, 1926 |
| 1,636,064 | Moxley | July 19, 1927 |
| 1,673,863 | Brown et al. | June 19, 1928 |
| 1,997,575 | Cummins | Apr. 16, 1935 |
| 2,035,047 | Cotter | Mar. 24, 1936 |
| 2,055,112 | Tarisien | Sept. 22, 1936 |
| 2,080,067 | Stucatur | May 11, 1937 |
| 2,195,605 | Thompson | Apr. 2, 1940 |
| 2,221,393 | Carnegie | Nov. 12, 1940 |
| 2,576,336 | Farkas | Nov. 27, 1951 |
| 2,577,660 | Krueger | Dec. 5, 1951 |
| 2,595,969 | McFarland | May 6, 1952 |
| 2,611,281 | Gray et al. | Sept. 23, 1952 |
| 2,640,373 | Jandasek | June 2, 1953 |
| 2,667,085 | Ackerman | Jan. 26, 1954 |
| 2,679,768 | Baule | June 1, 1954 |